United States Patent [19]

Kawai

[11] Patent Number: 4,530,590
[45] Date of Patent: Jul. 23, 1985

[54] IMAGE SCANNING SYSTEM HAVING A REVERSIBLY ROTATABLE SUB-SCANNING DRUM

[75] Inventor: Yasuhiro Kawai, Kanagawa, Japan

[73] Assignee: Fuji Photo Film Co., Ltd., Kanagawa, Japan

[21] Appl. No.: 491,003

[22] Filed: May 3, 1983

[30] Foreign Application Priority Data

May 12, 1982 [JP] Japan .................................. 57-79635

[51] Int. Cl.³ ...................... G03G 21/00; G03G 15/30
[52] U.S. Cl. ..................................... 355/8; 355/3 SH; 355/3 R; 355/14 R; 271/246
[58] Field of Search ................. 355/3 SH, 3 DR, 3 R, 355/8, 14 R; 250/200, 559, 560, 561; 358/199, 291, 209, 285, 286, 287; 346/108, 134, 76 L, 76 PH; 271/265, 246

[56] References Cited

U.S. PATENT DOCUMENTS

| | | | |
|---|---|---|---|
| 3,368,701 | 2/1968 | Copping et al. | 271/265 X |
| 4,067,021 | 1/1978 | Baylis et al. | 346/76 L |
| 4,146,326 | 3/1979 | Taylor et al. | 355/3 SH |
| 4,326,222 | 4/1982 | Connin et al. | 358/285 X |
| 4,354,756 | 10/1982 | Arai et al. | 355/8 X |
| 4,387,979 | 6/1983 | Ohishi et al. | 355/8 X |

*Primary Examiner*—A. T. Grimley
*Assistant Examiner*—Terry Flower
*Attorney, Agent, or Firm*—Sughrue, Mion, Zinn, Macpeak, and Seas

[57] ABSTRACT

An image scanning system includes a sub-scanning drum adapted to be rotated both in the regular direction to feed a recording sheet material in the sub-scanning direction which is perpendicular to the rotational axis of the drum and in the reverse direction opposite to the sub-scanning direction, and a main scanning system for scanning a light beam across the recording sheet material in the direction of the rotational axis of the drum. The system further includes a pair of nip rolls removably disposed on the drum, a stopper removably disposed downstream of the drum and the nip rolls, and a sheet discharger. The recording sheet material is fed toward the stopper with the drum being stopped and the nip rolls being held away from the drum, and is supported thereon in the unrestrained state. Then the nip rolls are pressed against the drum sandwiching the sheet material therebetween and at the same time the stopper is retracted away from the sheet material. The sub-scanning drum is rotated in the regular direction or the reverse direction, if desired, to control the blank space formed between the first scanning line and the leading end of the sheet material before the drum is rotated for scanning. The sheet discharger is arranged not to act on the sheet material during the scanning.

4 Claims, 8 Drawing Figures

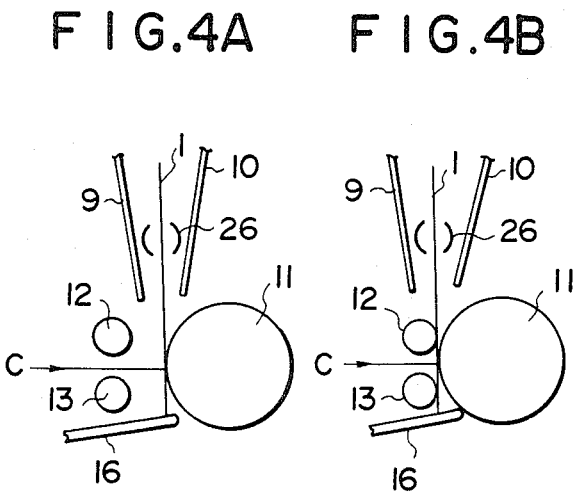
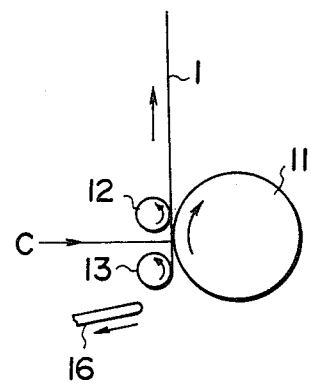
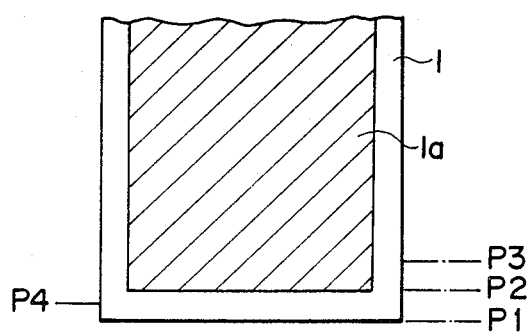
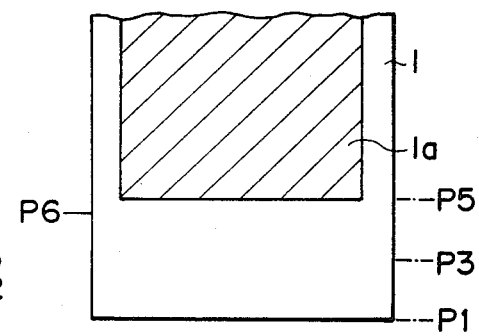

IMAGE SCANNING SYSTEM HAVING A REVERSIBLY ROTATABLE SUB-SCANNING DRUM

BACKGROUND OF THE INVENTION

1. Field of the Invention

This invention relates to an image scanning system for two-dimensionally scanning a light beam along a recording sheet material, and more particularly to an improvement in a sub-scanning mechanism of an image scanning system in which the main scanning is conducted using a light deflector and the sub-scanning is accomplished by mechanically moving a recording sheet material.

2. Description of the Prior Art

For recording an image or reading out a recorded image as for example in facsimiles, there has been in wide use an image scanning system in which a light beam is one-dimensionally deflected by a deflector to form a scanning line on a recording sheet material (main scanning) and the recording sheet material is moved in a direction perpendicular to the scanning line (sub-scanning), whereby a plurality of scanning lines arranged in the direction of the sub-scanning in parallel to each other are formed. In the image scanning system, the main scanning must be conducted with a constant period and the recording sheet material must be moved in the sub-scanning direction at a constant speed. When the speed at which the recording sheet material is moved in the sub-scanning direction (sub-scanning speed) varies, the density of the scanning lines fluctuates. The fluctuation in the density of the scanning lines results in fluctuation in the density of the image, thereby lowering the quality of the image. This problem is especially significant when processing images having continuous gradation. See, for example, "Various Problems in the Sub Scanning in a Cylindrical Facsimile" ("National Technical Report" Pages 550 to 558, No. 55, vol. 22, October, 1976), or "Visibility and Correction of Periodic Interference Structures in Line-by-Line Recorded Images" ("Journal of Applied Photographic Engineering" Pages 86 to 92, No. 2, vol. 2, April, 1976). Further, our experiments have revealed that when the sub-scanning speed fluctuates by 0.1% in recording an image with a density of 10 to 20 lines/mm, the obtained image exhibits visually detectable density fluctuation.

Conventionally, the sub scanning mechanism for feeding the recording sheet material at a constant speed with a high accuracy comprises a screw rod which is engaged with a nut fixed to a table for carrying a recording sheet material. By rotating the screw rod at a constant speed, the table is fed at a constant speed in the axial direction of the screw rod. This sub-scanning mechanism is disadvantageous in increasing the processing rate since the table must be returned to the original position after the scanning of one sheet material is finished and the image scanning operation must be interrupted while the table is returned. Further, the sub-scanning mechanism is expensive since the screw rod, the nut and a guide rail for guiding the table must be produced with a very high accuracy and since various complicated mechanisms are required for fixing the recording sheet material on the table, discharging the same from the table and locating the same in a predetermined position on the table. Since such complicated mechanisms are combined, the recording sheet material is apt to be positioned in the wrong position and the sub-scanning mechanism frequently gets jammed with the recording sheet material.

Thus, we have proposed, in our U.S. patent application Ser. No. 395,320 filed on July 6, 1982 (European Publication No. 0069384), an improved image scanning system which is inexpensive and able to effect sub-scanning with a high accuracy without jamming of the recording sheet material, and in which the time required for changing the recording sheet material is reduced to the minimum.

The image scanning system comprises a sub-scanning drum adapted to be continuously rotated to feed the recording sheet material in the sub-scanning direction which is perpendicular to the rotational axis of the sub-scanning drum, a main scanning system for scanning a light beam across the recording sheet material in the direction of the rotational axis of the sub-scanning drum, at least one nip roll movable between a first position in which it is pressed against the sub-scanning drum at a part near the scanning position of the light beam and a second position in which it is removed therefrom, a sheet feeding means for feeding the recording sheet material between the sub-scanning drum and the nip roll with the recording sheet material being unstrained, a stopper which is disposed downstream of the sub-scanning drum and the nip roll with respect to the feeding path of the recording sheet material and is movable into and away from the feeding path, a sheet discharging means for discharging the recording sheet material, and an associating means for associating the nip roll and the stopper with each other, said sheet discharging means being arranged so as not to act on the recording sheet material to be discharged until the scanning of the recording sheet material is completed.

In the image scanning system, said associating means need not move the nip roll and the stopper simultaneously insofar as the nip roll and the stopper move in response to the movement of each other. Further, said sheet discharging means may be provided at a position spaced from the nip roll by a distance larger than the length of the recording sheet material so as not to act on the recording sheet material while the recording sheet material is pressed against the sub-scanning drum by the nip roll. Otherwise, the sheet discharging means may be positioned spaced from the nip roll by a distance not larger than the length of the recording sheet material insofar as the scanning of the recording sheet material has been completed by the time the leading end of the recording sheet material is brought into contact with the sheet discharging means.

In the image scanning system, the recording sheet material is fed toward the stopper with the nip roll removed from the rotating sub-scanning drum and the stopper positioned in the sheet feeding path. When the leading end of the recording sheet material abuts against the stopper and the recording sheet material is positioned in a predetermined position with respect to the sub-scanning drum, the nip roll is pressed against the sub-scanning drum sandwiching the recording sheet material therebetween, whereby the recording sheet material is moved in the sub-scanning direction. The stopper is retracted from the sheet feeding path when the nip roll is pressed against the sub-scanning drum so as not to prevent the feeding of the recording sheet material at a constant speed. The sub-scanning drum is continuously rotated and the feeding of the recording sheet material is started when the nip roll is pressed against the drum sandwiching the recording sheet material therebetween. Therefore, fluctuation in the sheet feeding speed cannot occur due to overshooting or ringing at the starting time as frequently occurs in conventional systems in which the sub-scanning mechanism is actuated in response to introduction of the recording sheet material into the sub-scanning mechanism. Further, in the image scanning system, the recording sheet material is free from the sheet feeding means when it is supported on the stopper, and is free from the sheet discharging means while the scanning is effected, which also contributes to prevention of fluctuation in the sheet feeding speed. Further, since the sub-scanning drum is continuously rotated, as soon as one recording sheet material is removed from the sub-scanning drum, the next recording sheet material can be fed to the sub-scanning drum. Thus, the time required for changing the recording sheet material is reduced to the minimum.

Although being basically satisfactory, the image scanning system involves some problems in practical use. For example, there is a possibility that the recording sheet material is scratched by the nip roll when the recording sheet material is pressed against the sub-scanning drum by the nip roll to start scanning, since the sub-scanning drum is continuously rotated at a constant speed. Further, in the image scanning system, the distance between the leading end of the recording sheet material and the first scanning line formed on the sheet material is determined depending upon the distance between the stopper and the scanning position which are both fixed. However, the size of the sheet material is not always constact and different size of recording sheet materials are used according to the kind of image to be recorded. The size of images also varies and different size of images are recorded on recording sheet materials of the same size. It is not preferable, from the viewpoint of efficiency of recording and reading out, to start scanning from a position spaced by a fixed distance from the leading end of the recording sheet material irrespective of the size of the recording sheet material or the size of the image to be recorded thereon. Practically, the distance between the first scanning line and the leading end of the recording sheet material is preferred to be as small as possible so that a larger amount of information can be carried thereon.

SUMMARY OF THE INVENTION

In view of the foregoing observations and description, the primary object of the present invention is to provide an image scanning system which is inexpensive and able to effect sub-scanning with a high accuracy without jamming of the recording sheet material, and in which the time required for changing the recording sheet material is reduced to the minimum, and, at the same time, scanning can be started from any desired position spaced from the leading end of the recording sheet material to record an image or to read out the image recorded thereon.

Another object of the present invention is to provide an image scanning system in which scanning can be started from near the leading end of the recording sheet material.

Still another object of the present invention is to provide an image scanning system in which the recording sheet material can be prevented from being scratched.

The image scanning system in accordance with the present invention comprises a sub-scanning drum which is rotatable in both a regular direction for feeding a recording sheet material in the sub-scanning direction and the reverse direction opposite to the regular direction, the sub-scanning direction being perpendicular to the rotational axis of the sub-scanning drum; a main scanning system for scanning a light beam across the recording sheet material in a direction parallel to the rotational axis of the sub-scanning drum; at least one nip roll movable between a first position in which it is pressed against the sub-scanning drum at a part near the scanning position of the light beam and a second position in which it is removed therefrom; a sheet feeding means for feeding the recording sheet material between the sub-scanning drum and the nip roll with the recording sheet material being nonstrained; a stopper which is disposed downstream of the sub-scanning drum and the nip roll with respect to the feeding path of the recording sheet material and is movable into and away from the feeding path; a sheet discharging means for discharging the recording sheet material; an associating means for associating the nip roll and the stopper with each other; and a drum controlling means which controls rotation of the sub-scanning drum to select the position of the recording sheet material with respect to the scanning position of the light beam upon initiation of the scanning so that the scanning is started from a desired position on the recording sheet material; said sheet discharging means being arranged so as not to act on the recording sheet material to be discharged until the scanning of the recording sheet material is completed.

To be brief the present invention improves upon the image scanning system disclosed in our U.S. patent application described above, and the image scanning system of the present invention operates substantially in the same manner as that of the U.S. patent application except the following.

In the image scanning system of the present invention, the sub-scanning drum is once stopped when the recording sheet material is fed between the nip roll and the sub-scanning drum and supported on the stopper before the nip roll is pressed against the sub-scanning drum. Then, if desired, the sub-scanning drum is rotated in either direction without operating the main scanning system. That is, when the blank in the leading end portion of the recording sheet material is desired to be larger than the regular space obtained when the recording sheet material is on the stopper, or when the scanning is to be started from a position farther from the leading end than the regular position, the sub-scanning drum is rotated in the regular direction before starting the scanning to move the leading end of the recording sheet material away from the scanning position of the light beam by a desired distance, and vice versa. Of course, when the blank may be of the regular size or when the scanning may be started from the regular position, the sub-scanning drum may be rotated in the regular direction simultaneously with operation of the main scanning system to immediately start scanning. However, in any case, it is preferred that the starting position on the recording sheet material from which the scanning is to be started be positioned away from the scanning position of the light beam toward upstream in the sub-scanning direction so that the sub-scanning drum will rotate in the regular direction by an angle before the main scanning system is operated to actually start scanning with the starting position on the recording sheet material being brought into alignment with the scanning position of the light beam to permit the rotational speed of the sub-scanning drum to reach a constant speed, whereby the scanning is started after the rotational speed thereof is stabilized.

BRIEF DESCRIPTION OF THE DRAWINGS

FIG. 5 is a fragmentary plan view of the recording sheet material illustrating the condition in which the blank in the leading end portion of the recording sheet material is narrowed, and FIG. 6 is a fragmentary plan view of the recording sheet material illustrating the condition in which the blank in the leading end portion of the recording sheet material is widened.

DESCRIPTION OF THE PREFERRED EMBODIMENT

Figure 1:
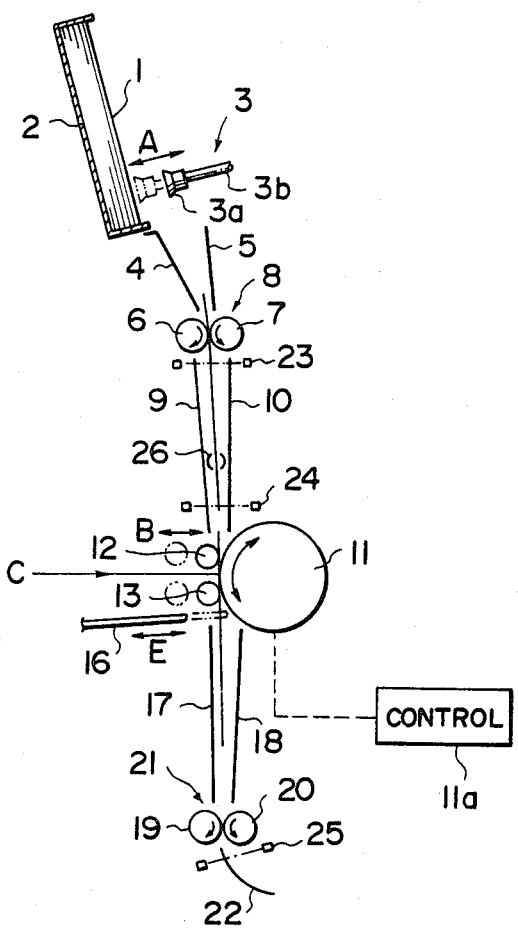
FIG. 1 a schematic side view of an image scanning system in accordance with an embodiment of the present invention.

FIG. 1 schematically shows an embodiment of the present invention in the form of an image recording system. In this embodiment a recording sheet material 1 having a photosensitive layer is fed along a substantially vertical path. A recording sheet magazine 2 having a closed bottom and an open top is positioned near the top of the system with its open top facing the substantially vertical feeding path of the recording sheet material 1. A plurality of recording sheet materials 1 are stacked in the magazine 2 with the photosensitive side of each recording sheet material directed toward the closed bottom of the magazine 2. A vacuum holder 3 comprising a suction cup 3a and a suction pipe 3b is disposed with the suction cup 3a directed toward the lower part of the open top of the magazine 2. The vacuum holder 3 is mounted movably back and forth in the direction of the arrow A and draws the recording sheet material 1 against the suction cup 3a under the suction force provided through the suction pipe 3b. A pair of guide plates 4 and 5 are disposed below the magazine 2 so that the space therebetween tapers downwardly. A pair of nip rolls 6 and 7 are disposed below the guide plates 4 and 5 with the contact line thereof being opposed to the lower end of the space between the guide plates 4 and 5. The nip rolls 6 and 7 together form a sheet feeding device 8 and are rotated in the directions shown by arrows. A second pair of guide plates 9 and 10 are disposed below the sheet feeding device 8 with their upper ends being opposed to the nip rolls 6 and 7, respectively. The space between the guide plates 9 and 10 has a wide upper end opening upward and a narrow lower end opening downward. A sub-scanning drum 11 is disposed below the pair of guide plates 9 and 10 with one side face thereof being projected under the lower end of the space between the guide plates 9 and 10. The sub-scanning drum 11 can be drivingly rotated, under the control of a control device 11a, in both the regular direction in which it feeds the recording sheet material 1 downwardly or in the sub-scanning direction and the reverse direction in which it feeds the same upwardly or in the direction opposite to the sub-scanning direction.

The regular direction and the reverse direction correspond to the counterclockwise direction and the clockwise direction, respectively, as seen in FIG. 1. A pair of nip rolls 12 and 13 are located below the pair of guide plates 9 and 10 opposed to the peripheral surface of the sub-scanning drum 11. The nip rolls 12 and 13 are integrally movable back and force in the direction of the arrow B to be brought into contact with and removed from the sub-scanning drum 11. The nip roll 12 and 13 are vertically spaced from each other and a scanning light beam C travels therebetween to impinge upon the recording sheet material 1 on the sub-scanning drum 11.

Figure 2:
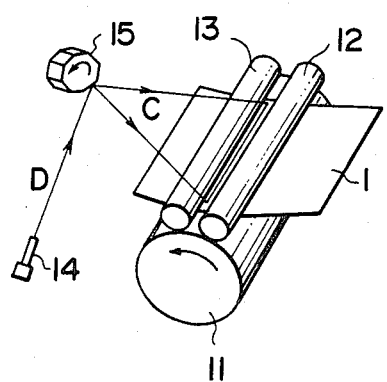
FIG. 2 is an enlarged perspective view of a part of the image scanning system of FIG. 1.

FIG. 2 is an enlarged view showing an optical system for projecting the scanning light beam C. As shown in FIG. 2, a light beam D, e.g., a laser beam emitted from a light source 14 is deflected by a deflector 15 to be scanned as the scanning light beam C across the recording sheet material 1 between the nip rolls 12 and 13 in the direction of the axis of the drum 11. The deflector 15 may be a multi-faceted mirror or a galvanometer.

Figure 3:
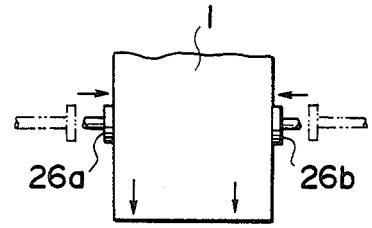
FIG. 3 is a schematic elevational view of a part of the image scanning system of FIG. 1, FIGS. 4A to 4C respectively show the relations among the recording sheet material, the nip rolls and the sub-scanning drum at different stages of the operation of the image scanning system of FIG. 1.

Again in FIG. 1, below the lower nip roll 13 is disposed a stopper 16 which is movable back and forth in the direction of the arrow E between the operative position near the sub-scanning drum 11 and a retracted position removed therefrom. Below the stopper 16 are disposed a third pair of guide plates 17 and 18 spaced from each other. The upper end of the space between the guide plates 17 and 18 is opposed to the side surface of the drum 11 at which the nip rolls 12 and 13 are brought into contact with the drum 11. Below the guide plates 17 and 18 are disposed another pair of nip rolls 19 and 20 with the contact line thereof opposed to the lower end of the space between the guide plates 17 and 18. The pair of nip rolls 19 and 20 together form a sheet discharging device 21, and are drivingly rotated in the direction shown by arrows. A guide plate 22 is provided below the sheet discharging device 21 for discharging the recorded sheet material 1. Adjacent to the upper and lower ends of the guide plates 9 and 10 are respectively provided sheet detectors 23 and 24, each detector comprising a light emitter and a photodetector, for example. Further, another detector 25 is provided below the sheet discharging device 21. A sheet locating device 26 for locating in the main scanning direction the recording sheet material 1 fed between the guide plates 9 and 10 is provided at an intermediate portion of the guide plates 9 and 10. The sheet locating device 26 comprises, as shown in FIG. 3, a pair of deflecting members 26a and 26b movable toward and away from each other in a direction perpendicular to the sheet material feeding direction. The deflecting members 26a and 26b are positioned widely apart from each other while the leading end portion of the recording sheet material 1 is passed therebetween, and are subsequently moved toward each other to locate the recording sheet material 1 in a direction perpendicular to the sheet feeding direction. The sheet locating device of this type is well known.

Now, the operation of the image scanning system of this embodiment will be described hereinbelow. When recording an image on the recording sheet material 1, the vaccum holder 3 is moved leftwardly in FIG. 1 and at the same time a suction force is applied through the suction pipe 3b to draw against the suction cup 3a one of the recording sheet material 1 stacked in the magazine 2. The suction holder 3 is then moved rightwardly until the recording sheet material 1 on the suction cup 3a is positioned over the upper end of the space between the guide plates 4 and 5. When the vacuum holder 3 is stopped, the application of the suction force is stopped and the recording sheet material 1 falls away from the suction cup 3a falling between the guide plates 4 and 5 onto the nipping portion of the nip rolls 6 and 7. The recording sheet material 1 is fed between the guide plates 9 and 10 by the nip rolls 6 and 7. When the recording on the previous recording sheet material is still being continued on the sub-scanning drum 11, the nip rolls 6 and 7 are stopped when the leading end portion of the recording sheet material 1 is detected by the detector 24. When the recording on the previous recording sheet material is completed, the nip rolls 19 and 20 of the sheet discharging device 21 are driven and the nip rolls 12 and 13 are moved away from the sub-scanning drum 11, whereby the recorded sheet material falls onto the nip rolls 19 and 20 passing between the guide plates 17 and 18, and is discharged onto the discharging guide plate 22 by the nip rolls 19 and 20. The sub-scanning drum 11 is stopped in response to removal of the nip rolls 12 and 13 therefrom. When the sheet detector 25 detects the leading end portion of the recorded sheet material during the discharging step to confirm that there remains no recording sheet material on the sub-scanning drum 11, said stopper 16 is moved toward the sub-scanning drum 11 to the operative position near the drum 11. At the same time, the nip rolls 6 and 7 of the sheet feeding device 8 are rotated to feed the recording sheet material 1 toward the sub-scanning drum 11. The distance between the sheet feeding device 8 and the stopper 16 is selected to be larger than the length of the recording sheet material 1. Accordingly, the recording sheet material 1 falls by gravity onto the stopper 16 in the unrestrained state after passing through the nip rolls 6 and 7. When the sheet detector 23 detects that the trailing end of the recording sheet material 1 has passed by the detector 23, said sheet locating device 26 is actuated to locate the recording sheet material 1 in the predetermined position with respect to the axial direction of the drum 11 as described above. (See FIG. 4A) Then the nip rolls 12 and 13 are integrally pressed against the sub-scanning drum 11 (FIG. 4B) and the stopper 16 is moved to the retracted position away from the recording sheet material 1. At the same time, the deflecting members 26a and 26b of the sheet locating device 26 are moved away from the recording sheet material 1.

In FIGS. 5 and 6, P3 indicates the regular starting position on which the first scanning line is recorded if the scanning is started immediately after the state shown in FIG. 4B. That is, position P3 is the position at which the scanning light beam C impinges upon the recording sheet material 1 if the scanning is started with the leading end P1 of the recording sheet material 1 supported on the stopper 16. Thus, if the scanning is started from the regular starting position P3, a blank space is formed between the regular starting position P3 and the leading end P1. If the blank space is desired to be narrower to use the space on the recording sheet material more effectively, the sub-scanning drum 11 is rotated in the reverse direction, under the control of the control device 11a, in response to the retracting movement of the deflecting members 26a and 26b. When the sub-scanning drum 11 rotates in the reverse direction, the recording sheet material 1 is fed upwardly nipped by the drum 11 and the idling nip rolls 12 and 13 as shown in FIG. 4C, whereby the leading end P1 is moved toward the scanning position of the light beam C so that the starting position on the recording sheet material 1 approaches the leading end P1 to narrow the blank space and make the new starting position as indicated at P2 in FIG. 5. When the sub-scanning drum 11 is subsequently rotated in the regular direction with the main scanning system simultaneously actuated, the scanning is started from the new starting position P2 as the scanning region in this case is indicated at 1a in FIG. 5. However, in order to avoid adverse influence of the fluctuation in the rotational speed of the sub-scanning drum 11 at the start on the quality of the recorded image, it is preferred that the recording sheet material 1 be fed further upwardly to a position in which the scanning light beam C impinges upon the recording sheet material 1 at a position, indicated at P4, nearer the leading end P1 than the position P2 when the scanning is to be started from the position P2, then the sub-scanning drum 11 be driven in the regular direction without actuating the main scanning system until the position P2 reaches the scanning position of the light beam C. This permits the sub-scanning drum 11 to be driven at a stabilized constant speed before the scanning is actually started.

On the other hand, when the scanning is to be started from a position (indicated at P5 in FIG. 6) away from the leading end P1 by a distance larger than the distance between the regular starting position P3 and the leading end P1 to widen the blank space, the sub-scanning drum 11 is driven in the regular direction to advance the recording sheet material 1 so that the leading end P1 is moved beyond the stopper 16 by a distance equal to the distance between the regular starting position and the position P5 from which the scanning is to be started. However, in this case, it is preferred that the recording sheet material 1 be stopped when the position P6 nearer the leading end P1 than the position P5 reaches the scanning position of the light beam C for the same reason as in the case described above with reference to FIG. 5.

In the image scanning system of this embodiment, the size of the blank space can be easily adjusted by rotating the sub-scanning drum in either direction before the scanning is actually effected. Further, in the image scanning system of this embodiment, the recording sheet material 1 is completely removed from the sheet feeding device 8 and the sheet discharging device 21 when it is fed nipped by the sub-scanning drum 11 and the nip rolls 12 and 13. Accordingly the sub-scanning speed cannot be affected by the sheet feeding device 8 or the sheet discharging device 21. Further it is not necessary to adjust the position of the sub-scanning drum 11 when the recording sheet material 1 is fed thereto and therefore the recording sheet material 1 can be continuously fed to the recording section. Further, the image scanning system of this embodiment does not jam even if two recording sheet materials 1 are simultaneously fed by the sheet feeding device 8, since the recording sheet material 1 is fed to the sub-scanning drum 11 and is discharged therefrom by permitting the recording sheet material 1 to fall under its own weight.

Furthermore, when the recording sheet material 1 is located with respect to the sub-scanning drum 11 in the axial direction thereof by the sheet locating means, the recording sheet material 1 is removed from the sheet feeding device 8. Therefore, the recording sheet material 1 can be located in the correct position even if the recording sheet material 1 passes through the sheet feeding device 8 in an inclined state, whereby the structure of the sheet locating device 8 can be simplified.

In the above embodiment, when one recording sheet material is on the sub-scanning drum 11, the next recording sheet material is fed until the leading end portion thereof is detected by the detector 24 and held there until the previous sheet material is discharged from the sub-scanning drum 11. However, the next sheet material may be held with its leading end abutting against the sheet feeding nip rolls 6 and 7 which are stopped when the previous sheet material is on the sub-scanning drum 11. In this case the detector 24 can be omitted. Whether or not the previous sheet material is on the sub-scanning drum 11 can be detected by detecting the position of the nip rolls 12 and 13, for example. Although a pair of nip rolls 12 and 13 are used for pressing the recording sheet material 1 against the sub-scanning drum 11 in the above embodiment, a single nip roll may be used in case that the sub-scanning drum is a vacuum suction type one.

Although in the above embodiment, the sheet feeding path is arranged to vertically extend and the recording sheet material 1 is fed to the sub-scanning drum 11 and discharged therefrom by allowing it to fall under its own weight, it is possible to arrange the sheet feeding path to extend horizontally and to feed the recording sheet material 1 to the sub-scanning drum 11 by the inertia force of the sheet material 1 imparted thereto by the sheet feeding device. However, the arrangement of the above embodiment is preferred in that it is free from the problem of jamming as described above.

Said sheet locating device 26 can be omitted if the sheet locating device 8 is arranged to locate the recording sheet material 1 with respect to the sub-scanning drum 11 in the axial direction thereof. However, this adds to the manufacturing cost of the system.

Although, in the above embodiment, the image scanning system is used for recording an image on the recording sheet material, the image scanning system of the present invention may be used for reading a recorded image.

I claim:

1. An image scanning system for two-dimensionally scanning a light beam across a recording sheet material comprising: a sub-scanning drum which is rotatable in both a regular direction for feeding a recording sheet material in the sub-scanning direction and the reverse direction opposite to the regular direction, the sub-scanning direction being perpendicular to the rotational axis of the sub-scanning drum; a main scanning system for scanning a light beam across the recording sheet material in a direction parallel to the rotational axis of the sub-scanning drum; at least one nip roll movable between a first position in which it is pressed against the sub-scanning drum at a part near the scanning position of the light beam and a second position in which it is removed therefrom; sheet feeding means for feeding the recording sheet material between the sub-scanning drum and the nip roll with the recording sheet material being unrestrained; a stopper which is disposed downstream of the sub-scanning drum and the nip roll with respect to the feeding path of the recording sheet material and is movable into and away from the feeding path; sheet discharging means for discharging the recording sheet material; and drum controlling means which controls rotation of the sub-scanning drum to select the position of the recording sheet material with respect to the scanning position of the light beam upon initiation of the scanning so that the scanning is started from a desired position on the recording sheet material; said sheet discharging means being arranged so as not to act on the recording sheet material to be discharged until the scanning of the recording sheet material is completed.

2. An image scanning system as defined in claim 1 in which said sheet feeding means comprises feeding rolls spaced from said stopper by a distance larger than the length of the recording sheet material, and said sheet discharging means comprises feeding rolls.

3. An image scanning system as defined in claim 2 in which the recording sheet material is fed from the sheet feeding means to the sub-scanning drum by being permitted to fall under its own weight.

4. An image scanning system as defined in claim 3 in which the recording sheet material is fed from the sub-scanning drum to the sheet discharging means after the scanning is completed by being permitted to fall under its own weight.

* * * * *